United States Patent Office 3,696,094
Patented Oct. 3, 1972

3,696,094
BENZODIAZEPINIUM SALTS AND PROCESS FOR PREPARING THE SAME
Ryuji Tachikawa, Hiromu Takagi, Toshiharu Kamioka, Mitsunobu Fukunaga, Yoichi Kawano, and Tetsuo Miyadera, Tokyo, Japan, assignors to Sankyo Company Limited, Tokyo, Japan
No Drawing. Filed Oct. 16, 1969, Ser. No. 9,241
Claims priority, application Japan, Oct. 24, 1968, 43/77,502; Oct. 25, 1968, 43/77,831; Oct. 28, 1969, 44/68,134
Int. Cl. C07d 53/06
U.S. Cl. 260—239.3 D                    5 Claims

ABSTRACT OF THE DISCLOSURE

New benzodiazepinium salts of the formula

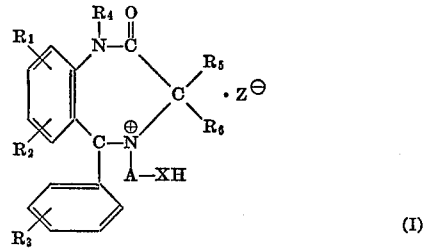

(I)

wherein $R_1$, $R_2$ and $R_3$ may be the same or different and each represents hydrogen atom, a lower alkyl group, a lower alkoxy group, a halogen atom, hydroxy group, nitro group, cyano group, an acyl group, trifluoromethyl group, amino group, an acylamino group, a N-mono(lower alkyl)amino group, a N-di-(lower alkyl)amino group, an acyloxy group, carboxyl group, an alkoxycarbonyl group, carbamoyl group, a N-mono(lower alkyl)carbamoyl group, a N-di(lower alkyl)carbamoyl group, a lower alkylthio group, a lower alkylsulfinyl group or a lower alkylsulfonyl group;
$R_4$ represents hydrogen atom, a lower alkyl group, a cycloalkyl group, an aralkyl group, an aryl group or phenacyl group;
$R_5$ and $R_6$ may be the same or different and each represents hydrogen atom or a lower alkyl group;
A represents a polymethylene group which may be substituted with a lower alkyl group;
X represents oxygen atom or sulfur atom and Z is an acid radical. These salts exhibits highly excellent psychosedative activity with favourable water-solubility and thus are useful as a tranquilizer. They are prepared by treating a benzodiazepine derivative of the formula

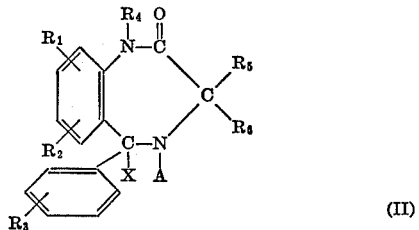

(II)

wherein $R_1$, $R_2$, $R_3$, $R_4$, $R_5$, $R_6$, A and X are as defined above with an inorganic or organic acid or by reacting a benzodiazepine derivative of the formula

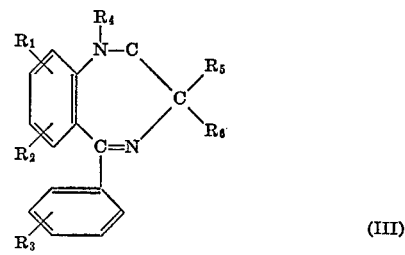

(III)

wherein $R_1$, $R_2$, $R_3$, $R_4$, $R_5$ and $R_6$ are as defined above with a compound of the formula $$Y—A—XH$$

wherein A and X are as defined above and Y represents a halogen atom in the presence of an inorganic or organic acid. The benzodiazepinium salts of the above Formula I can also be converted to the benzodiazepine derivatives of the above Formula II by treatment with water or a base.

---

This invention relates to a new class of benzodiazepinium salts and process for preparing the same.

More particularly, it relates to new benzodiazepinium salts having the formula

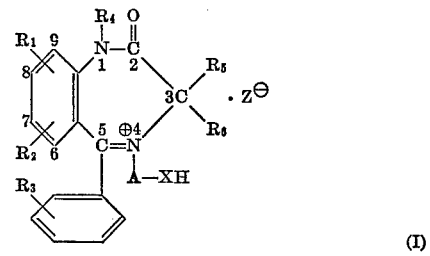

(I)

wherein $R_1$, $R_2$ and $R_3$ may be the same or different and each represents hydrogen atom, a lower alkyl group, a lower alkoxy group, a halogen atom, hydroxy group, nitro group, cyano group, an acyl group, trifluoromethyl group, amino group, an acylamino group, a N-mono(lower alkyl)amino group, a N-di(lower alkyl)amino group, an acyloxy group, carboxyl group, an alkoxycarbonyl group, carbamoyl, a N-mono(lower alkyl)carbamoyl group, a N-di(lower alkyl)carbamoyl group, a lower alkylthio group, a lower alkylsulfinyl group or a lower alkylsulfonyl group;
$R_4$ represents hydrogen atom, a lower alkyl group, a cycloalkyl group, an aralkyl group, an aryl group or phenacyl group;
$R_5$ and $R_6$ may be the same or different and each represents hydrogen atom or a lower alkyl group;
A represents a polymethylene group which may be substituted with a lower alkyl group or phenyl group; and
X represents oxygen atom or sulfur atom
Z represents an acid radical and also to a process for preparing the benzodiazepinium salts of the above Formula I.

In the above Formula I, the lower alkyl group can be a straight or branched alkyl group, such as methyl, ethyl, n-propyl, isopropyl, n-butyl, sec.-butyl, tert.-butyl and the like. The lower alkoxy group can be, for example, methoxy, ethoxy, propoxy, isopropoxy, butoxy and the like. The halogen atom can be fluorine, chlorine, bromine or iodine. The acyl group can be aliphatic and aromatic acryl group such as formyl, acetyl, propionyl, butyryl, benzoyl, toluoyl, naphthoyl and the like. The acylamino group can be, for example, acetylamino, propionylamino, butyrylamino, benzoylamino, toluylamino, naphthoylamino, and the like. The N-mono(lower alkyl)amino group can be, for example, N-methyl, -ethyl, -propyl or -butylamino group. The N-di(lower alkyl)amino group can be, for example, N-dimethyl, -diethyl, -dipropyl or dibutylamino group. The acyloxy group can be, for example, acetoxy, propionyloxy, butyryloxy, benzoyloxy and the like. The alkoxycarbonyl group can be, for example, methoxycarbonyl, ethoxycarbonyl, propoxycarbonyl, butoxycarbonyl and the like. The N-mono(lower alkoxy)carbamoyl group can be, for example, N-methyl, -ethyl, -propyl or -butylcarbamoyl. The N-di(lower alkyl)carbamoyl group can be, for example, N-dimethyl, -diethyl, -dipropyl or -dibutylcarbamoyl. The lower alkylthio group can be, for example, methylthio, ethylthio, propylthio, butylthio and the like. The lower alkylsulfinyl group can be, for example, methylsulfinyl, ethylsulfinyl, propylsulfinyl, butylsulfinyl and the like. The lower alkylsulfonyl group can be, for example, methylsulfonyl, ethylsulfonyl, propylsulfonyl, butylsulfonyl and the like. The cycloalkyl group can be, for example, cyclopropyl, cyclopentyl, cyclohexyl and the like. The aralkyl group can be, for example, benzyl, phenethyl and the like. The aryl group can be, for example, phenyl, naphthyl and the like. The polymethylene group can be, for example, ethylene, propylene, trimethylene, 1,2-butylene, 1,3-butylene, 2,3-butylene, tetramethylene, 1-phenylethylene, 1-phenylmethylethylene and the like.

The benzodiazepinium salts of the above Formula I are all novel compounds unknown in the prior art and show high psychosedative activity. More particularly, they exert both tranquilizing and antidepressant activities on the central nervous system and produce calmness and relaxation. In addition to such favourable psycholeptic properties, the benzodiazepinium salts of this invention have an extremely low toxicity to man, less tendency to produce side effects and a good solubility in water. Thus, the benzodiazepinium salts of this invention are useful as a minor tranquilizer in the relief of various psychoneurotic depression.

Accordingly, it is one object of this invention to provide a new class of the benzodiazepinium salts (I) which are valuable minor tranquilizing drugs.

It is another object of this invention to provide a process for preparing the novel benzodiazepinium salt (I) which can be employed as a medicine.

The benzodiazepinium salts of the above Formula I of this invention, as explained hereinabove, are useful as a minor tranquilizer. These active compounds may be employed for the treatment of psychoneurotic disorders in the form of a pharmaceutical preparation which comprises the benzodiazepinium salts (I) and a pharmaceutically acceptable carrier.

The pharmaceutical preparation may be in the form of oral preparations including tablets, capsules, powders, oral suspensions and syrups, or of parenteral preparations including injectable solutions and suspensions. In forming these preparations, there may be employed any pharmaceutically acceptable carriers commonly used in the art. Examples of such carriers are pharmaceutical vehicle, binder or filler such as water, starch, gelatin, lactose, talc, cellulosic materials, magnesium stearate, vegetable oils, gum and any other known material. These pharmaceutical preparations may, if desired, contain various kinds and types of additives, such as preserving agents, stabilizing agents, emulsifying agents, buffers or salts for adjusting osmotic pressure and they may be also sterilized in a conventional manner.

The amount to be administered for the treatment of psychoneurotic disorders, that is, the dosage of the active benzodiazepinium salt (I) should be determined by skilled physicians taking consideration of the ages and weight of patients, kinds and severities of disorders, possible side effects and other factors, but there is usually employed the total daily dosage for adults of about 5 to 100 mg., preferably in multiple doses such as three or more times a day, while larger total daily dosages may be effectively employed in some cases. Moreover, the active compounds (I) of this invention may be continuously and satisfactorily administered to man for a long period of time based upon the severities of disorders.

According to another aspect of this invention, the new benzodiazepinium salt (I) of this invention is prepared by a process which comprises (A) treating a benzodiazepine compound having the formula

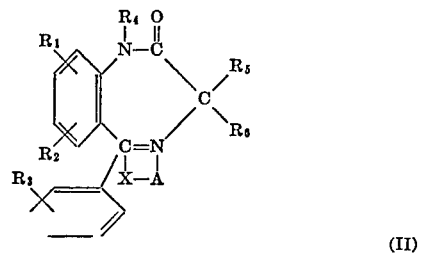

(II)

wherein $R_1$, $R_2$, $R_3$, $R_4$, $R_5$, $R_6$, A and X are as defined above with an acid or (B) reacting a benzodiazepine compound having the formula

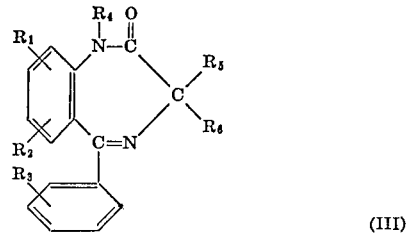

(III)

with a compound having the formula

Y—A—XH    (IV)

wherein A and X are as defined above and Y represents a halogen atom.

In one embodiment of the present process, i.e. the embodiment (A) involving the preparation of the benzodiazepinium salt (I) starting from the benzodiazepine compound (II), the reaction may be suitably carried out by treating the starting benzodiazepine compound (II) with a suitable acid in the presence of an inert solvent.

Representative examples of the solvent to be employed include aromatic hydrocarbons, e.g. benzene, toluene and xylene; lower alkanols, e.g. methanol, ethanol and isopropanol; ethers, e.g. diethyl ether, dioxane and tetrahydrofuran; halogenated hydrocarbons, e.g. carbon tetrachloride, chloroform and dichloromethane; esters of organic acids, e.g. ethyl acetate and butyl acetate; nitriles, e.g. acetonitrile; dialkylformamides, e.g. dimethylformamide; dialkylsulfoxides, e.g. dimethylsulfoxide; water; and the like. There may be conveniently employed any other solvents that would not adversely affect the present reaction. Aromatic hydrocarbons are preferable because of easy handling during the procedure.

Representative examples of the acid to be employed include inorganic acids, e.g. hydrochloric, hydrobromic, hydroiodic, phosphoric and sulfuric acids; and organic acids, e.g. benzenesulfonic, p-toluenesulfonic, trifluoroacetic and picric acids.

The amount of the acid employed in this embodiment is generally in the range of one or more equivalents to the starting benzodiazepine compound (II).

The reaction temperature is not critical in this embodiment, but it is usual and preferable to conduct the reaction at a temperature below room temperature. The reaction period of time is also not critical, but it usually requires an extremely short period of time to bring the reaction to its end.

After completion of the reaction, the desired product (I) may be recovered from the reaction mixture by a conventional method. For instance, where aromatic hydrocarbon such as benzene is employed as a reaction solvent, as the desired product precipitates out in situ because of its sparing solubility in such a solvent, it may be recovered by removal of the solvent with decantation, twice or more times washing with benzene followed by drying. Where such reaction solvent as water or lower alkanol is employed, the reaction mixture is concentrated at a lower temperature to separate crystalline substance which may be then washed twice or more with benzene and dried. The desired product thus recovered may be further purified by recrystallization.

The benzodiazepine compounds (II) which may be employed as a starting material in this embodiment (A) are all novel compounds and may be easily prepared, for example, by a process which comprises reacting a substituted acetylaminobenzophenone derivative having the formula

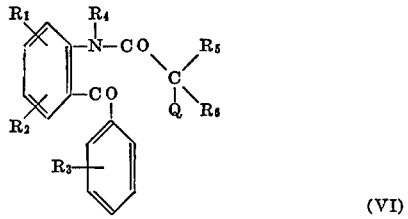

(VI)

wherein $R_1$, $R_2$, $R_3$, $R_4$, $R_5$ and $R_6$ are as defined above and Q is an acid radical of a reactive ester with a primary amine derivative having the formula

$$H_2N-A-X-H \qquad (VII)$$

wherein A and X are as defined above.

In another embodiment of this invention, i.e. the embodiment (B) involving the preparation of the benzodiazepinium salt (I) starting from the benzodiazepine compound (III), the reaction may be suitably carried out by bringing the starting benzodiazepine compound (III) in intimate contact with the compound (IV) and the acid in the presence or absence of an inert solvent.

Representative examples of the solvent, if employed, include aromatic hydrocarbons, e.g. benzene, toluene and xylene; ethers, e.g. diethylether, dioxane and tetrahydrofuran; esters of organic acids, e.g. ethyl acetate and butyl acetate; halogenated hydrocarbons, chloroform, carbon tetrachloride and dichloromethane; acetonitrile; dialkylformamides, e.g. dimethylformamide; dialkylsulfoxides, e.g. dimethyl sulfoxide; and the like. In general, ethers, e.g. dioxane are preferable. The presence of the solvent is preferred because of smooth reaction progressing and easy working of the reaction mixture.

Representative examples of the acid to be employed include inorganic acids, e.g. hydrochloric, hydrobromic, hydroiodic, sulfuric and phosphoric acids; and organic acids, e.g. trifluoroacetic, trichloroacetic and picric acids. Such acids may be utilized in this reaction in gaseous, liquid or solid state. It is preferable to portionwise and continuously incorporate the acid into the reaction system during the reaction, as the smooth reaction proceeds with suppressing any occurring side-reactions, which leads to an increased yield of the end product.

In the reaction of this embodiment, it is sometimes desirable to employ anhydrous solvent and acid, as the anhydrous reaction system is advantageous.

The reaction period of time is not critical in this embodiment, but it is usual and preferable to heat the reaction mixture at about 120–150° C., if a reaction solvent is absent, or at a reflux temperature of the solvent, if employed.

The starting benzodiazepine compound (III) and the reagent (IV) are usually employed in equimolar amounts, but a larger excess of the latter gives a better result. The larger amounts of the acid may be preferably employed than those of both starting material and reagent.

The reaction period of time may be widely varied depending upon mainly the type and kind of the starting material and acid employed, the reaction temperature applied and the like, but it usually takes about 10—30 hours. The incorporation and presence of a small amount of an iodide, e.g. sodium iodide and potassium iodide in the reaction system may frequently provide a much more reduced reaction period of time.

After completion of the reaction, the desired product may be recovered from the reaction mixture by a conventional method. For instance, where the reaction solvent is not employed, the pure desired product may be obtained by recrystallization of the reaction mixture as such from a suitable organic solvent, e.g. chloroform and, where the reaction solvent is employed, the pure desired product may be obtained by removal of the reaction solvent from the reaction mixture with distillation and subsequent recrystallization of the residue from a suitable solvent, e.g. chloroform-ether.

The benzodiazepinium salts (I) of this invention may also be converted to the benzodiazepine compound (II), which is also useful as a minor tranquilizer, by treatment with water or a base. It is, of course, contemplated in this invention to include this conversion within the purview of this invention.

This conversion is based upon the discovery that the benzodiazepinium salt (I) has a tendency to undergo ring closure within a higher pH range. Thus, such a conversion can be suitably effected by treating a solution of the benzodiazepinium salt (I) in a suitable solvent with water or an inorganic or organic base.

Representative examples of the solvent to be employed include water; lower alkanols, e.g. methanol and ethanol; halogenated hydrocarbons, e.g. chloroform and dichloromethane; and the like.

Representative examples of the inorganic or organic base which may be employed in this conversion include alkali metal and alkaline earth metal carbonates, e.g. sodium carbonate, potassium carbonate; aliphatic amines, e.g. triethylamine; pyridine; and the like. However, there may be satisfactorily employed any other organic or inorganic bases that could bring to a higher level from the initial pH value of a solution of the benzodiazepinium salt (I).

Where the benzodiazepinium salt (I) is to be converted to the benzodiazepine compound (II) in aqueous medium, such a conversion may be easily conducted by initially dissolving the starting material in a large excess amount of water without subsequent employment of additional water for conversion.

After treatment, the benzodiazepine compound (II) may be easily isolated by a conventional method. For instance, if the solvent in which the benzodiazepine compound (II) is sparingly soluble such as water or ethanol is employed, the precipitated end product may be recovered by filtration and, if the solvent in which the benzodiazepine compound (II) is easily soluble such as chloroform or dichloromethane is employed, the end product may be recovered by removal of the solvent with distillation and subsequent recrystallization of the residue from a suitable solvent, e.g. ethanol.

The following examples are given only for the purpose of illustrating this invention. They should not be construed to be limiting the scope of this invention.

Examples 1 to 15 describe the embodiment (A), i.e. the preparation of the benzodiazepinium salt (I) starting from the benzodiazepine compound (II).

Examples 16 to 27 describe the embodiment (B), i.e. the preparation of the benzodiazepinium salt (I) starting from the benzodiazepine compound (III).

Examples 28 to 34 describe the conversion of the benzodiazepinium salt (I) to the benzodiazepine compound (II).

The reactions in the process of this invention may be schematically illustrated as follows:

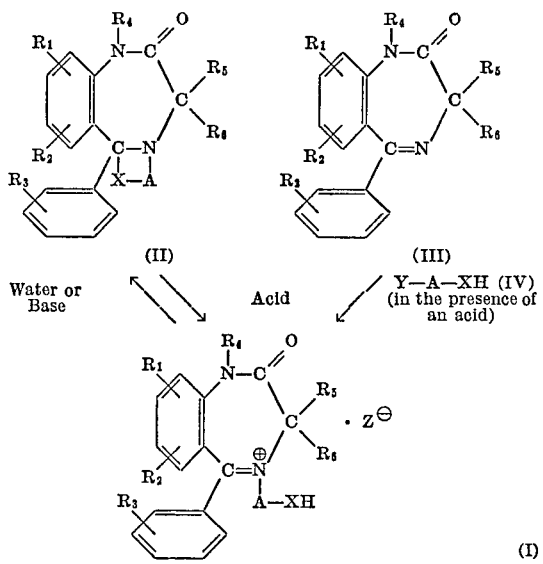

In the above formulae $R_1$, $R_2$, $R_3$, $R_4$, $R_5$, $R_6$, A, X and Z are as defined above.

EXAMPLE 1

7-chloro-5-phenyl-2-oxo-4-(2-hydroxyethyl)-2,3-dihydro-1H-1,4-benzodiazepinium chloride Into a solution of 4.8 g. of 7-chloro-5-phenyl-[5.4-b]-oxazolidino - 2,3,4,5 - tetrahydro - 1H - 1,4 - benzodiazepin-2-one in 100 ml. of benzene was introduced dried hydrogen chloride gas at a temperature below 40° C. The substance which precipitated in situ was separated from benzene layer by decantation, washed with two or three portions of benzene and dried to give the desired product as yellow crystals melting at 243° C. (with decomposition).

EXAMPLE 2

7-chloro-5-phenyl-2-oxo-4-(2-hydroxy-n-propyl)-2,3-dihydro-1H-1,4-benzodiazepinium chloride Following the procedure similar to that described in Example 1 and using 7-chloro-5-phenyl-[5.4-b]-5'-methyloxazolidino - 2,3,4,5 - tetrahydro - 1H - 1,4 - benzodiazepin-2-one, the desired product which became viscous at about 160° C. and decomposed at 237° C. with foaming was obtained.

EXAMPLE 3

7 - chloro - 1 - (4 - chlorobenzyl) - 5 - phenyl - 2 - oxo-4 - (2 - hydroxy - n - propyl) - 2,3 - dihydro - 1H - 1,4-benzodiazepinium chloride Following the procedure similar to that described in Example 1 and using 7-chloro-1-(4-chlorobenzyl)-5-phenyl - [5.4 - b] - 5' - methyloxazolidino - 2,3,4,5 - tetrahydro-1H,1,4-benzodiazepin-2-one, the desired product which melted at about 140° C. and gradually decomposed with foaming at a higher temperature was obtained.

EXAMPLE 4

7-bromo-5-phenyl-2-oxo-4-(2-hydroxyethyl)-2,3-dihydro-1H-1,4-benzodiazepinium chloride Following the procedure similar to that described in Example 1 and using 7-bromo-5-phenyl-[5.4-b]-oxazolidino - 2,3,4,5 - tetrahydro - 1H - 1,4 - benzodiazepin - 2-one, the desired product which became viscous at about 160° C. and decomposed with foaming at 231° C. was obtained.

Following the procedure similar to that described in this example and using hydrogen iodide, 7-bromo-5-phenyl - 2 - oxo - 4 - (2 - hydroxyethyl) - 2,3 - dihydro - 1H-1,4-benzodiazepinium iodide which became viscous at about 150–160° C. and decomposed at about 245° C. was obtained.

EXAMPLE 5

7-chloro-5-(2-chlorophenyl)-2-oxo-4-(2-hydroxyethyl)-2,3-dihydro-1H-1,4-benzodiazepinium chloride Following the procedure similar to that described in Example 1 and using 7-chloro-5-(2-chlorophenyl)-[5.4-b] - oxazolidino - 2,3,4,5 - tetrahydro - 1H - 1,4 - benzodiazepin-2-one, the desired product was obtained as yellow crystals which became viscous at about 170° C. and decomposed at about 197° C.

EXAMPLE 6

7-chloro-5-(4-nitrophenyl)-2-oxo-4-(2-hydroxy-n-propyl)-2,3-dihydro-1H-1,4-benzodiazepinium chloride Following the procedure similar to that described in Example 1 and using 7-chloro-5-(4-nitrophenyl)-[5.4-b]-5' - methyloxazolidino - 2,3,4,5 - tetrahydro- 1H - 1,4-benzodiazepin-2-one, the desired product was obtained as yellow crystals which became viscous at about 170° C. and decomposed at 180° C.

EXAMPLE 7

7-chloro-3-methyl-5-phenyl-2-oxo-4-(2-hydroxy-n-propyl)-2,3-dihydro-1H-1,4-benzodiazepinium chloride Following the procedure similar to that described in Example 1 and using 7-chloro-3-methyl-5-phenyl-[5.4-b]-5' - methyloxazolidino - 2,3,4,5 - tetrahydro - 1H - 1,4-benzodiazepin-2-one, the desired product was obtained as yellow crystals which became viscous at about 169° C. and decomposed at 189° C.

EXAMPLE 8

7-bromo-5-(2-chlorophenyl)-2-oxo-4-(2-hydroxyethyl)-2,3-dihydro-1H-1,4-benzodiazepinium chloride Following the procedure similar to that described in Example 1 and using 7-bromo-5-(2-chlorophenyl)-[5.4-b]-oxazolidino - 2,3,4,5 - tetrahydro - 1H - 1,4-benzodiazepin-2-one, the desired product was obtained as yellow crystals which became viscous at about 150° C. and gradually melted to liquid at 209° C.

EXAMPLE 9

7-chloro-5-phenyl-2-oxo-4-(3-hydroxy-n-propyl)-2,3-dihydro-1H-1,4-benzodiazepinium chloride Following the procedure similar to that described in Example 1 and using 7-chloro-5-phenyl-[5.4-b]-tetrahydro - 2H - 1',3'-oxazino-2,3,4,5-tetrahydro-1H-1,4-benzodiazepin-2-one, the desired product was obtained as yellow crystals which became viscous at about 170° C. and decomposed at 238° C.

EXAMPLE 10

7-chloro-5-phenyl-2-oxo-4-(2-hydroxy-n-propyl)-2,3-dihydro-1H-1,4-benzodiazepinium p-toluenesulfonate To a solution of 3.2 g. of 7-chloro-5-phenyl [5.4-b]-5' - methyloxazolidino - 2,3,4,5 - tetrahydro - 1H - 1,4-benzodiazepin-2-one in 100 ml. of ethanol was added 1.7 g. of p-toluene sulfonic acid and the resulting mixture was heated for about 10 minutes. The ethanol was distilled off and the residue was washed twice or three times with benzene and then dried to give the desired product which started to melt at about 130° C. and decomposed at 228° C.

EXAMPLE 11

3,7,9-trimethyl-5-phenyl-2-oxo-4-(2-hydroxy-n-propyl)-2,3-dihydro-1H-1,4-benzodiazepinium bromide Following the procedure similar to that described in Example 1 and using 3,7,9-trimethyl-5-phenyl-[5.4-b]-5'-methyloxazolidino - 2,3,4,5 - tetrahydro - 1H - 1,4-benzodiazepin-2-one and hydrogen bromide, respectively, the desired product was obtained as yellow crystals which became viscous with heating and melted at about 200° C.

EXAMPLE 12

7-chloro-1-ethyl-5-phenyl-2-oxo-4-(2-hydroxy-n-propyl)-2,3-dihydro-1H-1,4-benzodiazepinium chloride Following the procedure similar to that described in Example 1 and using 7-chloro-1-ethyl-5-phenyl-[5.4-b]-5'-methyloxazolidino - 2,3,4,5 - tetrahydro - 1H-1,4-benzodiazepin-2-one, the desired product was obtained as yellow crystals which started to gradually melt at about 150° C., became viscous at 165° C. and finally melted at 180° C.

EXAMPLE 13

7-chloro-5-(o-tolyl)-2-oxo-4-(2-hydroxy-n-propyl)-2,3-dihydro-1H-1,4-benzodiazepinium chloride Following the procedure similar to that described in Example 1 and using 7 - chloro - 5 - (o-tolyl)-[5.4-b]-5'-methyloxazolidino - 2,3,4,5 - tetrahydro - 1H-1,4-benzodiazepin-2-one, the desired product was obtained as yellow crystals which became viscous at about 170° C. and entirely melted at 197° C.

EXAMPLE 14

7-nitro-5-phenyl-2-oxo-4-(2-hydroxyethyl)-2,3-dihydro-1H-1,4-benzodiazepinium chloride Following the procedure similar to that described in Example 1 and using 7-nitro-5-phenyl-[5.4-b]-oxazolidino-2,3,4,5-tetrahydro-1H-1,4-benzodiazepin-2-one, the desired product was obtained as crystals melting at 224–230° C. (with decomposition).

EXAMPLE 15

7-chloro-5-phenyl-2-oxo-4-(2-mercaptoethyl)-2,3-dihydro-1H-1,4-benzodiazepinium chloride Following the procedure similar to that described in Example 1 and using 7-chloro-5-phenyl-[5.4-b]-thiazolidino-2,3,4,5-tetrahydro-1H-1,4-benzodiazepin-2 - one, the desired product was obtained as yellow crystals which became viscous at about 180–185° C. and entirely melted with decomposition at 257° C.

EXAMPLE 16

7-chloro-5-phenyl-2-oxo-4-(2-hydroxyethyl)-2,3-dihydro-1H-1,4-benzodiazepinium chloride A solution of 8.1 g. of 7-chloro-5-phenyl-2,3-dihydro-1H-1,4-benzodiazepin-2-one and 4.1 g. of ethylene bromohydrin in 50 ml. of dioxane was heated under reflux for 30 hours, while very gentle introduction of dried hydrogen chloride gas was maintained. After completion of the reaction, the solvent was distilled off from the reaction mixture and the residue was recrystallized from chloroform-ether to give the desired product as yellow crystals melting at 243° C. (with decomposition).

EXAMPLE 17

7-chloro-5-phenyl-2-oxo-4-(2-hydroxy-n-propyl)-2,3-dihydro-1H-1,4-benzodiazepinium chloride A mixture of 4.8 g. of 7-chloro-5-phenyl-2,3-dihydro-1H-1,4-benzodiazepin-2-one and 2.9 g. of 1-bromo-2-hydroxypropane was heated at 100–120° C. for 25 hours, while very gentle introduction of dried hydrogen chloride was maintained. After completion of the reaction, the reaction mixture was concentrated and the residue was recrystallized from chloroform-ether to give the desired product as crystals which softened at about 160° C. and decomposed with foaming at 237° C.

EXAMPLE 18

7-chloro-1-(4-chlorobenzyl)-5-phenyl-2-oxo-4-(2-hydroxy-n-dihydro-1H-1,4-benzodiazepinium chloride Following the procedure similar to that described in Example 19 and using 7-chloro-1-(4-chlorobenzyl)-5-phenyl - 2,3, - dihydro - 1H - 1,4 - benzodiazepin -2-one, to give the desired product as crystals which melted at about 140° C. and gradually decomposed with foaming at a higher temperature.

EXAMPLE 19

7-bromo-5-phenyl-2-oxo-4-(2-hydroxyethyl)-2,3-dihydro-1H-1,4-benzodiazepinium chloride Following the procedure similar to that described in Example 18 and using 7-bromo-5-phenyl-2,3-dihydro-1H-1,4-benzodiazepin-2-one, the desired product was obtained as crystals which softened at about 160° C. and decomposed with foaming at 231° C.

Following the procedure similar to that described in this example and using hydrogen iodide, 7-bromo-5-phenyl - 2 - oxo-4-(2-hydroxyethyl)-2,3-dihydro-1H-1,4-benzodiazepinium iodide was obtained as crystals which softened at 160° C. and decomposed at 245° C.

EXAMPLE 20

7-chloro-5-(2-chlorophenyl)-2-oxo-4-(2-hydroxyethyl)-2,3-dihydro-1H-1,4-benzodiazepinium chloride Following the procedure similar to that described in Example 18 and using 7-chloro-5-(2-chlorophenyl)-2,3-dihydro-1H-1,4-benzodiazepin-2-one, the desired product was obtained as crystals which softened at about 170° C. and decomposed at 197° C.

EXAMPLE 21

7-chloro-5-(4-nitrophenyl)-2-oxo-4-(2-hydroxy-n-propyl)-2,3-dihydro-1H-1,4-benzodiazepinium chloride Following the procedure similar to that described in Example 18 and using 7-chloro-5-(4-nitrophenyl)-2,3-dihydro-1H-1,4-benzodiazepin-2-one, the desired product was obtained as yellow crystals which softened at about 170° C. and decomposed at 180° C.

EXAMPLE 22

7-chloro-3-methyl-5-phenyl-2-oxo-4-(2-hydroxy-n-propyl)-2,3-dihydro-1H-1,4-benzodiazepinium chloride Following the procedure similar to that described in Example 18 and using 7-chloro-3-methyl-5-phenyl-2,3-dihydro-1H-1,4-benzodiazepin-2-one the desired product was obtained as yellow crystals which softened at 169° C. and entirely melted at 189° C.

EXAMPLE 23

7-bromo-5-(2-chlorophenyl)-2-oxo-4-(2-hydroxyethyl)-2,3-dihydro-1H-1,4-benzodiazepinium chloride Following the procedure similar to that described in Example 18 and using 7-bromo-5-(2-chlorophenyl)-2,3-dihydro-1H-1,4-benzodiazepin-2-one, the desired product was obtained as yellow crystals which softened at about 150° C., and gradually melted to liquid at 209° C.

EXAMPLE 24

7-chloro-5-(o-tolyl)-2-oxo-4-(2-hydroxy-n-propyl)-2,3-dihydro-1H-1,4-benzodiazepinium chloride Following the procedure similar to that described in Example 18 and using 7-chloro-5-(o-tolyl)-2,3-dihydro- 1H-1,4-benzodiazepin-2-one, the desired product was obtained as yellow crystals which became liquid at about 200° C.

EXAMPLE 25

3,7,9-trimethyl-5-phenyl-2-oxo-4-(2-hydroxy-n-propyl)-2,3-dihydro-1H-1,4-benzodiazepinium bromide Following the procedure similar to that described in Example 18 and using 3,7,9-trimethyl-5-phenyl-2,3-dihydro-1H-1,4-benzodiazepin-2-one, the desired product was obtained as yellow crystals which became liquid at about 200° C.

EXAMPLE 26

7-chloro-1-ethyl-5-phenyl-2-oxo-4-(2-hydroxy-n-propyl)-2,3-dihydro-1H-1,4-benzodiazepinium chloride Following the procedure similar to that described in Example 18 and using 7-chloro-1-ethyl-5-phenyl-2,3-dihydro-1H-1,4-benzodiazepin-2-one, the desired product was obtained as yellow crystals which softened at about 150° C. and entirely melted at 180° C.

EXAMPLE 27

7-nitro-5-phenyl-2-oxo-4-(2-hydroxyethyl)-2,3-dihydro-1H-1,4-benzodiazepinium chloride Following the procedure similar to that described in Example 18 and using 7-nitro-5-phenyl-2,3-dihydro-1H-1,4-benzodiazepin-2-one, the desired product was obtained as crystals melting at 224–230° C. (with decomposition).

EXAMPLE 28

7-chloro-5-phenyl-[5.4-b]-oxazolidino-2,3,4,5-tetrahydro-1H-1,4-benzodiazepin-2-one To a solution of 3.6 g. of 7-chloro-5-phenyl-2-oxo-4-(2-hydroxyethyl) - 2,3 - dihydro-1H-1,4-benzodiazepinium chloride in 50 ml. of water was continuously added a 5% aqueous sodium carbonate solution until the pH of the solution was reached to a pH 8.0–9.0. Then, the substance which precipitated in situ was recovered by filtration and dried to give the desired product as crystals melting at 175–176.5° C.

Following the procedure similar to that described above, but substituting the corresponding benzodiazepinium salt for 7-chloro-5-phenyl-2-oxo-4-(2-hydroxyethyl)-2,3-dihydro-1H-1,4-benzodiazepinium chloride the following benzodiazepine compounds were obtained.

7-nitro-5-phenyl-[5.4-b]-oxazolidino-2,3,4,5-tetrahydro-1H-1,4-benzodiazepin-2-one (M.P. 217–221° C.) with decomposition);
7-bromo-5-phenyl-[5.4-b]-5'-methyloxazolidino-2,3,4,5-tetrahydro-1H-1,4-benzodiazepin-2-one (M.P. 180–182° C.);
7,8-dichloro-5-phenyl-[5.4-b]-5'-methyloxazolidino-2,3,4,5-tetrahydro-1H-1,4-benzodiazepin-2-one (M.P. 196–197.5° C.);
7-chloro-1-methyl-5-phenyl-[5.4-b]-oxazolidino-2,3,4,5-tetrahydro-1H-1,4-benzodiazepin-2-one (M.P. 181–183° C.);
3,7,9-trimethyl-5-phenyl-[5.4-b]-oxazolidino-2,3,4,5-tetrahydro-1H-1,4-benzodiazepin-2-one (M.P. 218–221° C.);
7-chloro-1-methyl-5-(2-chlorophenyl)-[5.4-b]-oxazolidino-2,3,4,5-tetrahydro-1H-1,4-benzodiazepin-2-one (M.P. 155–158° C.);
7-nitro-1-methyl-5-phenyl-[5.4-b]-5'-methyloxazolidino-2,3,4,5-tetrahydro-1H-1,4-benzodiazepin-2-one (M.P. 156–158° C.);
7-chloro-5-(2-chlorophenyl)-[5.4-b]-5'-methyloxazolidino-2,3,4,5-tetrahydro-1H-1,4-benzodiazepin-2-one (M.P. 190–192° C. with decomposition);
7-chloro-5-(2-fluorophenyl)-[5.4-b]-oxazolidino-2,3,4,5-tetrahydro-1H-1,4-benzodiazepin-2-one (M.P. 181–183° C.);
7-bromo-5-(2-chlorophenyl)-[5.4-b]-oxazolidino-2,3,4,5-tetrahydro-1H-1,4-benzodiazepin-2-one (M.P. 204.5–207° C. with decomposition);
7-bromo-5-(2-chlorophenyl)-[5.4-b]-5'-methyloxazolidino-2,3,4,5-tetrahydro-1H-1,4-benzodiazepin-2-one (M.P. 196–198° C. with decomposition);
7-chloro-5-(2-methylphenyl)-[5.4-b]-5'-methyloxazolidino-2,3,4,5-tetrahydro-1H-1,4-benzodiazepin-2-one (M.P. 203–205° C. with decomposition);
7-chloro-5-(4-nitrophenyl)-[5.4-b]-5'-methyloxazolidino-2,3,4,5-tetrahydro-1H-1,4-benzodiazepin-2-one (M.P. 193–195° C.);
7-chloro-3-methyl-5-phenyl-[5.4-b]-5'-methyloxazolidino-2,3,4,5-tetrahydro-1H-1,4-benzodiazepin-2-one (M.P. 216–217° C.);
7-chloro-3-methyl-5-phenyl-[5.4-b]-thiazolidino-2,3,4,5-tetrahydro-1H-1,4-benzodiazepin-2-one (M.P. 205–207° C.); and
7-chloro-5-phenyl-[5.4-b]-thiazolidino-2,3,4,5-tetrahydro-1H-1,4-benzodiazepin-2-one (M.P. 241–243° C.).

EXAMPLE 29

7-chloro-5-phenyl-[5.4-b]-5'-methyloxazolidino-2,3,4,5-tetrahydro-1H-1,4-benzodiazepin-2-one To a solution of 4.8 g. of 7-chloro-5-phenyl-2-oxo-4-(2-hydroxy-n-propyl) - 2,3 - dihydro-1H-1,4-benzodiazepinium bromide in 40 ml. of ethanol was added portionwise 3 ml. of pyridine. Then, the substance which precipitated in situ was recovered by filtration, washed with ethanol and dried to give the desired product as crystals melting at 186–188° C.

EXAMPLE 30

7-chloro-9-methyl-5-phenyl-[5.4-b]-5'-methyloxazolidino-2,3,4,5-tetrahydro-1H-1,4-benzodiazepin-2-one To a mixture of 3.4 g. of 7-chloro-9-methyl-5-phenyl-2-oxo - 4 - (2 - hydroxy-n-propyl)-2,3-dihydro-1H-1,4-benzo-diazepinium chloride in 50 ml. of benzene was added portionwise with stirring 2.0 g. of triethylamine. Then, stirring was continued for about 1 hour. The benzene was distilled off, the residue was washed with water and then recrystallized from ethanol to give the desired product melting at 251–253° C.

Following the procedure similar to that described above and using 7-chloro-1-ethyl-5-phenyl-2-oxo-4-(2-hydroxy-n-propyl) - 2,3 - dihydro-1H-1,4-benzodiazepinium p-toluene sulfonate there was obtained 7-chloro-1-ethyl-5-phenyl-[5.4-b] - 5' - methyloxazolidino-2,3,4,5-tetrahydro-1H-1,4-benzodiazepin-2-one as crystals melting at 158–160° C.

EXAMPLE 31

7-chloro-5-(2-chlorophenyl)-[5.4-b]-oxazolidino-2,3,4,5-tetrahydro-1H-1,4-benzodiazepin-2-one Following the procedure similar to that described in Example 30 and using 7-chloro-(2-chlorophenyl)-2-oxo-4-(2-hydroxyethyl) - 2,3 - dihydro-1H-1,4-benzodiazepinium chloride, the desired product was obtained as crystals melting at 201–204° C. (with decomposition).

EXAMPLE 32

7-chloro-5-phenyl-[5.4-b]-tetrahydro-2H-1',3'-oxazino-2,3,4,5-tetrahydro-1H-1,4-benzodiazepin-2-one Following the procedure similar to that described in Example 30 and using 7-chloro-5-phenyl-2-oxo-4-(3-hydroxy-n-propyl) - 2,3 - dihydro-1H-1,4-benzodiazepinium iodide, the desired product was obtained as crystals melting at 221–223° C.

EXAMPLE 33

7-chloro-3-ethyl-5-phenyl-[5.4-b]-oxazolidino-2,3,4,5-tetrahydro-1H-1,4-benzodiazepin-2-one Following the procedure similar to that described in Example 30 and using 7-chloro-5-phenyl-3-ethyl-2-oxo-4-(2-hydroxyethyl)-2,3-dihydro-1H-1,4-benzodiazepinium bromide, the desired product was obtained as crystals melting at 183–184° C.

EXAMPLE 34

7-chloro-1-benzyl-5-phenyl-[5.4-b]-5'-methyloxazolidino-2,3,4,5-tetrahydro-1H-1,4-benzodiazepin-2-one To a solution of 5.8 g. of 7-chloro-1-benzyl-5-phenyl-2-oxo-4-(2-hydroxy-n-propyl)-2,3-dihydro-1H-1,4-benzo-diazepinium chloride in 30 ml. of water was slowly added portionwise a substantial amount of water until the solution became turbid and then crystalline substance thus precipitated was recovered by filtration and dried to give the desired product as crystals melting at 154–157° C.

What is claimed is:

1. A compound having the formula

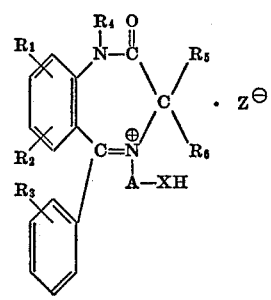

(I)

wherein $R_1$, $R_2$ and $R_3$ may be the same or different and each represents hydrogen, lower alkyl of 1–4 carbon atoms, lower alkoxy of 1–4 carbon atoms, halogen, hydroxy, nitro, cyano, lower alkanoyl, benzoyl, toluoyl or naphthoyl, trifluoromethyl, amino, lower alkanoylamino, benzoylamino, toluoylamino or naphthoyl amino, N-mono(lower alkyl)amino of 1–4 carbon atoms in the alkyl moiety, N-di(lower alkyl) amino of 1–4 carbon atoms in the alkyl moiety, lower alkanoyloxy or benzoyloxy, carboxyl, alkoxycarbonyl of 1–4 carbon atoms in the alkoxy moiety, carbamoyl, N-mono(lower alkyl)carbamoyl of 1–4 carbon atoms in the alkyl moiety, N-di(lower alkyl) carbamoyl of 1–4 carbon atoms in the alkyl moiety, lower alkylthio of 1–4 carbon atoms, lower alkylsulfinyl of 1–4 carbon atoms or lower alkylsulfonyl of 1–4 carbon atoms;

$R_4$ represents hydrogen, lower alkyl of 1–4 carbon atoms, cycloalkyl of 4–6 carbon atoms, phenylalkyl of 1–2 carbon atoms in the alkyl moiety, phenyl, naphthyl or phenacyl;

$R_5$ and $R_6$ may be the same or different and each represents hydrogen or lower alkyl of 1–4 carbon atoms;

A represents polymethylene which has 1–4 carbon atoms and may be substituted with lower alkyl of 1–4 carbon atoms or phenyl;

X represents oxygen or sulfur; and

Z represents an anion selected from the group consisting of chloride, bromide, iodide, phosphate, sulfate, benzenesulfonate, p-toluenesulfonate, trifluoroacetate and picrate.

2. 7-chloro-5-phenyl-2-oxo-4-(2-hydroxy-n-propyl)-2,3-dihydro-1H-1,4-benzodiazepinium chloride.

3. 7-bromo-5-phenyl-2-oxo-4-(2-hydroxyethyl)-2,3-dihydro-1H-1,4-benzodiazepinium chloride.

4. 5-chloro-5-(2-chlorophenyl)-2-oxo-4-(2-hydroxyethyl)-2,3-dihydro-1H-1,4-benzodiazepinium chloride.

5. A process for preparing a compound having the Formula I

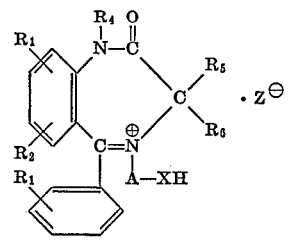

(I)

wherein $R_1$, $R_2$ and $R_3$ may be the same or different and each represents hydrogen, lower alkyl of 1–4 carbon atoms, lower alkoxy of 1–4 carbon atoms, halogen, hydroxy, nitro, cyano, lower alkanoyl, benzoyl, toluoyl or naphthoyl, trifluoromethyl, amino, lower alkanoylamino, benzoylamino, toluoylamino or naphthoylamino, N-mono(lower alkyl)amino of 1–4 carbon atoms in the alkyl moiety, N-di(lower alkyl) amino of 1–4 carbon atoms in the alkyl moiety, lower alkanoyloxy or benzoyloxy, carboxyl, alkoxycarbonyl of 1–4 carbon atoms in the alkoxy moiety, carbamoyl, N-mono(lower alkyl)carbamoyl of 1–4 carbon atoms in the alkyl moiety, N-di(lower alkyl) carbamoyl of 1–4 carbon atoms in the alkyl moiety, lower alkylthio, of 1–4 carbon atoms, lower alkylsulfinyl of 1–4 carbon atoms or lower alkylsulfonyl of 1–4 carbon atoms;

$R_4$ represents hydrogen, lower alkyl of 1–4 carbon atoms, cycloalkyl of 4–6 carbon atoms, phenylalkyl of 1–2 carbon atoms in the alkyl moiety, phenyl, naphthyl or phenacyl;

$R_5$ and $R_6$ may be the same or different and each represents hydrogen or lower alkyl of 1–4 carbon atoms;

A represents polymethylene which has 1–4 carbon atoms and may be substituted with lower alkyl of 1–4 carbon atoms or phenyl;

X represents oxygen or sulfur; and

Z represents an inorganic or organic acid radical which comprises treating a compound having the Formula II

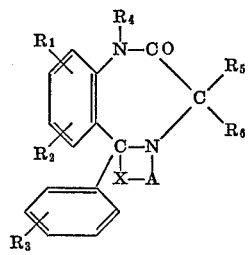

(II)

wherein $R_1$, $R_2$, $R_3$, $R_4$, $R_5$, $R_6$, X and A are as defined above with an inorganic or organic acid in the presence of an inert solvent.

(References on following page)

References Cited

UNITED STATES PATENTS

| | | | |
|---|---|---|---|
| 3,136,815 | 6/1964 | Reeder et al. | 260—239.3 D |
| 3,236,838 | 2/1966 | Archer et al. | 260—239.3 D |
| 3,239,564 | 3/1966 | Reeder et al. | 260—239.3 D |
| 3,270,053 | 8/1966 | Reeder et al. | 260—239.3 D |

FOREIGN PATENTS

| | | | |
|---|---|---|---|
| 1,339,762 | 9/1963 | France | 260—239.3 D |
| 6,816,789 | 5/1969 | Netherlands | 260—239.3 T |

OTHER REFERENCES

Bell et al. "J. Org. Chem." vol. 27 pp. 562–566 (1962).

Fryer et al. "J. Org. Chem." vol. 34 pp. 649–654 (1969) (March).

HENRY R. JILES, Primary Examiner

R. T. BOND, Assistant Examiner

U.S. Cl. X.R.

260—239.3 T, 562 K; 424—244